(12) United States Patent
Ng

(10) Patent No.: US 9,173,351 B1
(45) Date of Patent: Nov. 3, 2015

(54) LEAVES AND DEBRIS COLLECTING DEVICE

(71) Applicant: Kim Kwee Ng, Centereach, NY (US)

(72) Inventor: Kim Kwee Ng, Centereach, NY (US)

(*) Notice: Subject to any disclaimer, the term of this patent is extended or adjusted under 35 U.S.C. 154(b) by 0 days.

(21) Appl. No.: 14/726,604

(22) Filed: Jun. 1, 2015

(51) Int. Cl.
*A01B 45/00* (2006.01)
*A01G 1/12* (2006.01)
*E01H 1/00* (2006.01)

(52) U.S. Cl.
CPC . *A01G 1/125* (2013.01); *E01H 1/00* (2013.01)

(58) Field of Classification Search
CPC .......... E01H 1/00; E01H 1/047; B01B 45/00; B01B 43/00; B01B 59/04; A01D 42/02
USPC ............. 15/84, 83; 172/199, 612, 29; 171/25, 171/143; 56/344
See application file for complete search history.

(56) References Cited

U.S. PATENT DOCUMENTS

| | | | |
|---|---|---|---|
| 3,802,022 A * | 4/1974 | Fleming | 15/84 |
| 5,284,211 A * | 2/1994 | Tozer | 172/29 |
| 5,509,259 A * | 4/1996 | Milbury | 56/400.04 |
| 5,596,784 A * | 1/1997 | Tolmachoff | 15/83 |
| 5,742,968 A | 4/1998 | Nicholson | |
| 5,745,947 A * | 5/1998 | Liu et al. | 15/84 |
| 6,257,345 B1 * | 7/2001 | Tozer | 172/199 |
| 7,536,848 B2 * | 5/2009 | Briesemeister et al. | 56/328.1 |
| 7,784,257 B2 | 8/2010 | Williams et al. | |
| 8,250,696 B2 * | 8/2012 | Tozer | 15/78 |
| 8,646,141 B2 | 2/2014 | Johnson et al. | |
| 8,839,878 B2 | 9/2014 | Tozer | |
| 8,840,353 B2 * | 9/2014 | Hopkins | 414/338 |

\* cited by examiner

*Primary Examiner* — Nina Bhat

(57) ABSTRACT

A parallel-beams type collector comprises a flat porous platform which is enclosed by side walls. The flat porous platform is formed from a row of horizontally projected, parallel and elongated tines or thin rods. The debris is moved onto the porous platform as the collector is moved forward across the lawn with the elongated thin rods moving and penetrating through the grass. The collector is moved up along a curved path by a moving assembly. A flexible string is pulled via an array of rollers to move the collector up. The leaves and debris sitting in the collector can further be swept away by a sweeping assembly. Alternatively, a continuous endless chain is used to move the collector. A guide member is used to keep the collector in proper orientation during the collection of the debris.

20 Claims, 2 Drawing Sheets

LEAVES AND DEBRIS COLLECTING DEVICE

FIELD OF THE INVENTION

The present disclosure generally relates to a debris removal device for removing leaves and debris from the lawn and the like.

BACKGROUND OF THE INVENTION

U.S. Pat. No. 8,839,878, dated Sep. 23, 2014, "Device for collection of debris", discloses a device which allows the debris on the ground surface to pass upwardly through the openings in a flexible planar member. The debris goes over inclined pick-up portions of the device and thence onto collection surfaces of the device.

U.S. Pat. No. 8,646,141, dated Feb. 11, 2014, "Lawn sweeper assembly with adjustable brush assembly and hopper assembly and method of use thereof", describes a lawn sweeper that uses a brush to sweep the debris into a hopper assembly.

U.S. Pat. No. 7,784,257, dated Aug. 31, 2010, "Debris collection device", describes a device which uses a compression spring force trigger mechanism to eject the debris.

U.S. Pat. No. 5,742,968, dated Apr. 28, 1998, "Apparatus for removing debris from the ground", describes a rotatable brush which lifts the debris upwardly. The debris is forced into the space between the brush and a guide member. The debris is ejected into a hopper after leaving the guide member.

It is an object of this invention to make a fast collection of the leaves and debris without having to bend forward to collect the debris from the lawn. A parallel-beams type collector having a row of horizontally elongated tines or thin rods is employed. The rods are chosen to be thin enough and the gaps between the thin rods are appropriately selected so that the forward frictional force is small when the thin rods are moving and penetrating through the grass. The leaves sitting above the grass are moved onto a receiving platform formed by the thin rods. The collection of the leaves and debris above the grass is made without getting the collector to touch the ground. The collection is faster with minimal labor forces. This new method of collection is preferred over other rake-based debris removal devices, brushes and other sweeping devices, as the rake and the sweeper usually touch the ground during the collection process. The contact with the ground creates frictional forces and increases the labor efforts in clearing the debris.

The present invention provides a cost effective, higher efficiency and attractive debris collecting device for removing the leaves and debris from the ground. It is easy to build, operate and maintain. It would eliminate back pains for many people who are working to make the environment better to enjoy.

BRIEF SUMMARY OF THE INVENTION

A parallel-beams type collector comprises a flat porous platform which is enclosed by side walls. The flat porous platform is formed from a row of horizontally projected, parallel and elongated thin rods. The end portion of the platform is bent to function as a rear wall. The collector is moved across the lawn, with the elongated thin rods pointing forwardly and penetrating through the grass. The elongated thin rods are moving under the leaves and debris. The debris is moved onto the receiving porous platform as the collector is moved forward. When the amount of the collected leaves and debris sitting in the collector is sufficient for removal, the collector is moved up along a curved path by a moving assembly.

Various types of moving assemblies are described. A flexible string is pulled via an array of rollers to move the collector up. An array of helical springs is used to return the collector to the ground. Alternatively, a continuous endless chain is used to move the collector. In a preferred embodiment of the invention, a movable wall plate is employed to sweep away the leaves and debris which are stuck in the collector. A guide member is used to keep the collector in proper orientation near the ground and the subsequent removal of the debris from the collector at an elevated point of the curved path.

Figure 1:
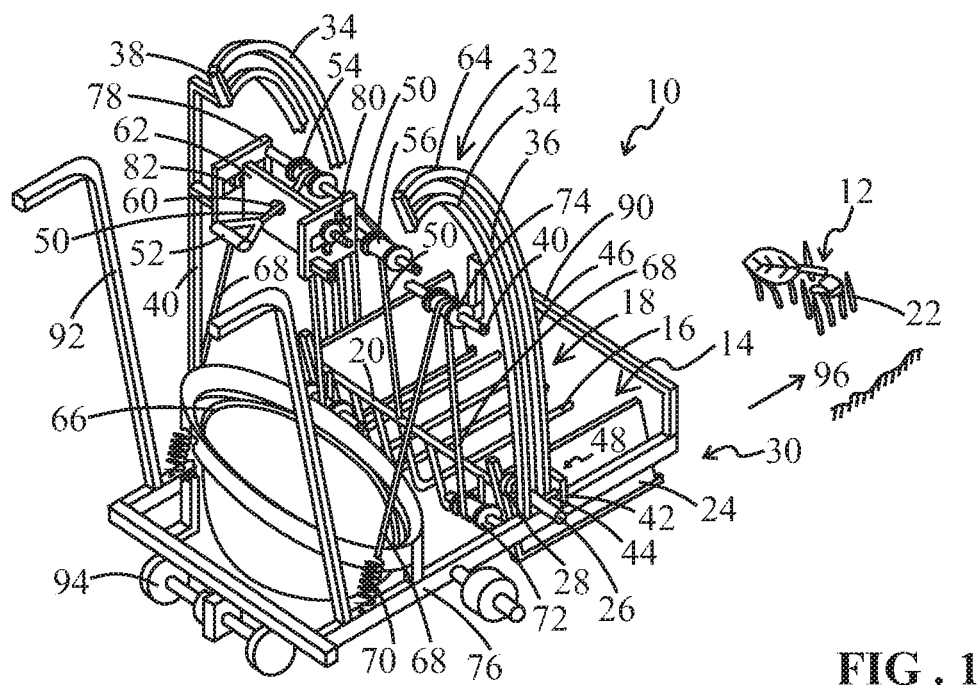
FIG. 1 is a simplified diagram of a first preferred embodiment in which a collector is lifted along a curved track.

It should be noted that all the drawings are diagrammatic and not drawn to scale. Relative dimensions and proportions of parts of these figures have been shown exaggerated or reduced in size for the sake of clarity and convenience in the drawings. Accordingly, the drawings and description are to be regarded as illustrative in nature and not as restrictive.

DETAILED DESCRIPTION OF THE INVENTION

A better and more complete understanding of the practice of the invention is provided by the following description and reference to the accompanying drawings, wherein like symbols refer to like elements of the invention.

In a first preferred embodiment of the invention shown in FIG. 1, a leaves and debris collecting device 10 for removing leaves and debris 12 from the ground or the like comprises a parallel-beams type collector 14 which constitutes a collector means. The parallel-beams type collector 14 comprises a row of essentially spaced-apart parallel projecting beams or thin rods 16 to form a wide and elongated flat porous platform 18. The end portions of thin rods 16 are bent at an angle to form a rear wall. The distal end points of bent portions of thin rods 16 are joint together by a supporting transverse header beam 20. The porous platform 18 is a receiving section for receiving the leaves and debris 12. The thin rods 16 are preferably made of a flexible material which is strong enough to support the weight of the leaves and debris 12. The cross section of each thin rod 16 is made narrower enough that the thin rods 16 can easily be moved to penetrate through the grass 22 with minimal frictional force.

A plurality of side walls 24 is mounted on the opposite sides of collector 14 to keep the leaves and debris 12 within the collector 14. A sliding cylindrical rod 26 having a base 28 is attached to each side 30 of the collector 14. A structural element, which is a two-legs member 32, is mounted on each side 30 of the collector 14. The structural element, which comprises a plurality of structures, is configured or arranged to produce a track or a path for the translocation of the collector 14. Each two-legs member 32 is comprised of two legs 34 which are separated to provide a curved path 36. The sliding cylindrical rod 26 is movable along the path 36 residing in the gap between the legs 34. The legs 34 are joint at the top by a header bar 38. The two-legs members 32 are mounted to a multi-connecting support beam 40.

The curved path 36 is a pre-defined trajectory along which the collector 14 is guided. A rectangular plate 42, having an array of legs 44 which are mounted on the sliding cylindrical rod 26, is slidable on the exterior surface 46 of two-legs members 32. The rectangular plate 42 which tends to rotate while sliding on the exterior curved surface 46 of two-legs members 32, has limited angular movement with respect to the curved path 36. A guide member 48, which comprises the rectangular plate 42 and the legs 44, is used to guide and maintain a proper orientation of the collector 14 with respect to the curved path 36, as the collector 14 is moved in a vertical circuit determined by the two-legs members 32. The orientation of the thin rods 16 of collector 14 in a forward direction is usually pointed in a direction normal to the tangential component of the curved path 36.

The rectangular plate 42 is oriented with an angle which is the same as the inclination angle of a small section in the bottom portion of curved path 36 near the ground. The porous platform 18 of collector 14 is level with the ground when the collector 14 is pulled and positioned near the ground. A transport means comprises a moving assembly which has an array of rollers and a chain-like element, a belt or flexible strings. A first flexible string 50 is connected between a pull handle 52 and the transverse header beam 20 of collector 14. The first flexible string 50 runs over an array of rollers 54, 56 and passes through a through bore 60 in a removable wall 62.

The pull handle 52 is used to pull the first flexible string 50 and lifts the collector 14 until the collector 14 reaches the top portion 64 of the curved path 36. The top portion 64 of curved path 36 is bent at an angle and the collector 14 is tilted at the upper distal end of curved path 36, which is positioned at an elevated point higher above the ground surface. The collected leaves and debris 12 sitting on the porous platform 18 of collector 14 are allowed to fall under gravity into an opening of a storage means which is usually a container or a storage bag 66 located below.

When the collector 14 is moved up along the path 36, the collector 14 pulls a second flexible string 68 which is attached between the transverse header beam 20 of collector 14 and an end of a helical spring 70 via a plurality of rollers 72, 74. The helical spring 70 is stretched and expanded upwardly at an inclined angle when the collector 14 is lifted. The other end of the helical spring 70 is fixedly attached to a frame means 76.

The helical spring 70 is used to return the collector 14 to its initial state, i.e. the collector 14 is returned to its original position near the ground. When the pull handle 52 is released, the helical spring 70 in a stretched state is contracted and pulls the collector 14 downward. The pull handle 52 is stopped by the through bore 60 in the removable wall 62 when the collector 14 reaches the ground. The removable wall 62 is threadebly mounted between two support walls 78 by a plurality of fasteners and wing nuts 80. The removable wall 62 is relocatable to a different position by sliding the removable wall 62 along rectangular slots 82 in the support walls 78 which are fixedly mounted to the multi-connecting support beam 40.

The collector 14 is lowered to a desirable height above the ground by the contraction of the helical spring 70 when the pull handle 52 is released. The height of the porous platform 18 of collector 14 from the ground is determined by the position of the removable wall 62 in the slots 82 of support walls 78. When the collector 14 reaches the desirable height above the ground and the pull handle 52 is stopped by the through bore 60, the collector 14 is ready for the next cycle in the collection of leaves and debris 12. A transverse safety bar 90 is mounted to the frame 76 near the front end of the collector 14. A set of handles 92 and wheels 94 are provided to move the leaves and debris collecting device 10.

To operate the leaves and debris collecting device 10, the collector 14 is moved essentially horizontally across the lawn as the device 10 is pushed with a set of wheels 94 rolling across the lawn. FIG. 1 shows the debris collecting device 10 in which the collector 14 is leveled with the ground while moving in a forward direction 96. The projecting thin rods 16 are pointing forwardly and penetrating through the grass 22. The leaves and debris 12 sitting above the grass 22 are picked up by the moving projecting thin rods 16 of collector 14 and moved onto the receiving porous platform 18. Leaves and debris 12 would start to accumulate on the porous platform 18 of collector 14. After the collector 14 is filled with the leaves and debris 12, the handle 52 in the moving assembly is pulled to move the collector 14 up along the path 36. At the high end of the path 36, the leaves and debris 12 are allowed to fall into the storage bag 66. The handle 52 is then released, the collector 14 is lowered to the ground by the contraction of the helical spring 70. The next cycle in the collection of the debris 12 would be ready to start again.

Figure 2:
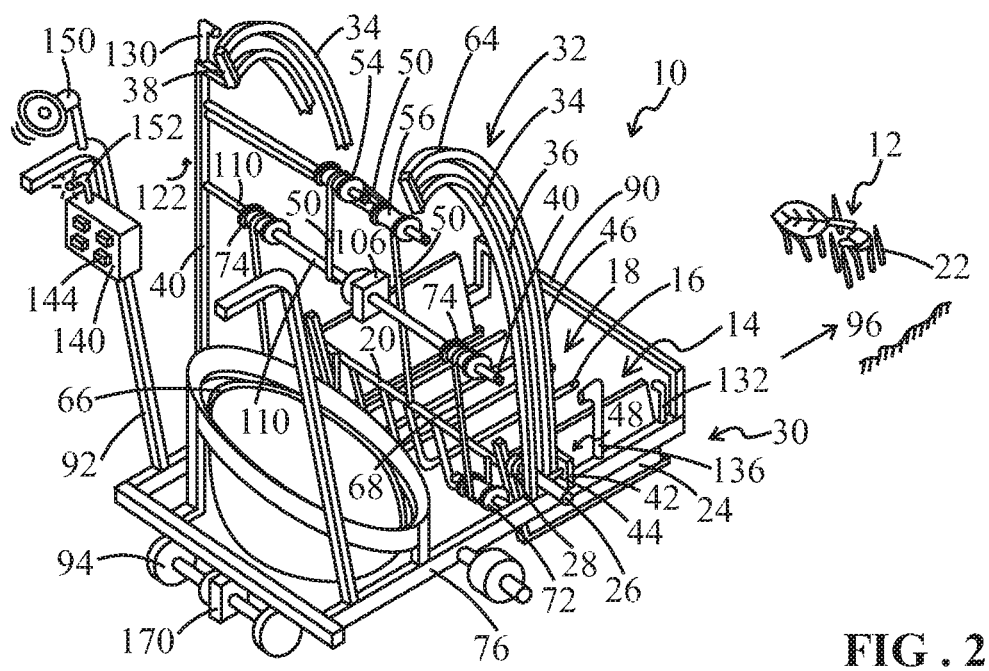
FIG. 2 is a simplified diagram of a second preferred embodiment using a power drive means to drive a moving assembly.

In a second preferred embodiment of the invention shown in FIG. 2, in which the collector 14 of FIG. 1 is employed, a power drive 106 is used to lift the collector 14. All components having the same symbols have the same operational features of those in FIG. 1, except that the distal end points of the first and the second flexible strings 50, 68 are respectively attached to an axle 110 and the roller 74, instead of the pull handle 52 and the helical spring 70 of FIG. 1. The first flexible string 50 is connected between the transverse header beam 20 and the axle 110 via a plurality of rollers 54, 56. The second flexible string 68 is connected between the transverse header beam 20 and the roller 74 via a roller 72. The roller 74 is mounted on the axle 110. The rollers 54, 56, 72 and the axle 110 are supported by the multi-connecting support beam 40.

When the axle 110 is rotated by the power drive 106 in an anti-clockwise directional sense 122, the first flexible string 50 pulls the collector 14 up along the path 36. At the same time, the second flexible string 68 is free to allow the collector 14 to move up as the axle 110 rotates. When the axle 110 is rotated by the power drive 106 in a clockwise directional sense, the collector 14 is moved down along the path 36 as the second flexible string 68 pulls the collector 14 in a downward direction.

A plurality of position detection sensors 130, 132 is used to detect the position of the collector 14. Some mechanical switches, proximity sensors, magnetic sensors, infrared sensors, etc, can be used to get the position of the collector 14 along the path 36. A camera sensor 136 which detects the amount of debris 12 sitting on the porous platform 18 of collector 14 allows an automatic and efficient use of the debris collecting device 10. The information from the sensors 130, 132, 136 is sent to a stored program device means 140 via wireless transmission or electrical wires (not shown). The stored program device means 140 has a plurality of buttons 144. The stored program device means 140 issues a set of instructions and commands to control the power drive 106. The instructions are set and stored in the stored program device means 140 by a user of the debris collecting device 10. A plurality of alerting accessories is used in the operation of the collector 14. For example, a loudspeaker or a buzzer 150, with a plurality of blinking LED light emitters 152 are employed to warn against an impending movement of the collector 14. The debris collecting device 10 is movable by a power drive means 170 which rotates the wheels 94 for movement across the ground.

Figure 3:
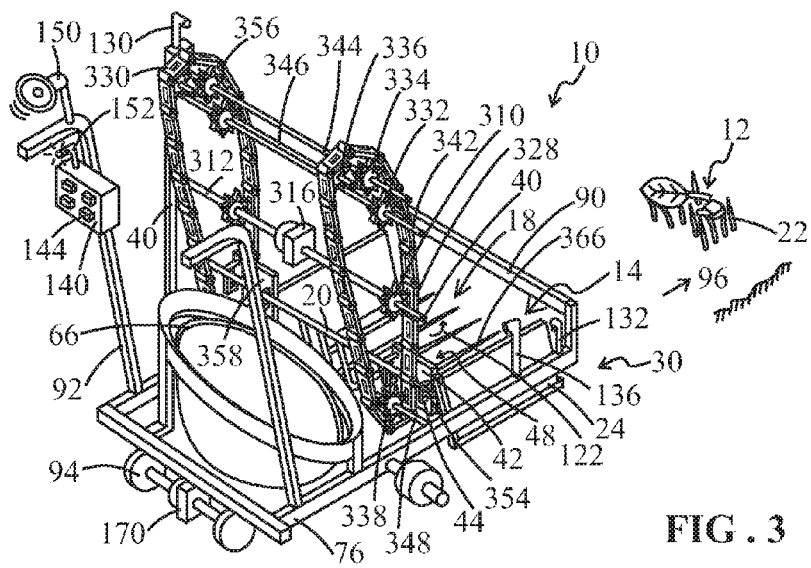
FIG. 3 is a simplified diagram of a third preferred embodiment using a power drive to rotate a chain-driven collector.

In a third preferred embodiment of the invention shown in FIG. 3, a cog wheel 310 which is mounted on an axle 312 is rotated by a power drive means 316. The cog wheel 310 rotates a continuous endless chain 328 which comprises a plurality of chain link elements 330. A plurality of cog wheels 332, 334, 336, 338, which are respectively mounted on axles 342, 344, 346, 348, is used with the cog wheel 310 to define a vertical circuit of movement for the collector 14. A portion of the circuit is bent at the upper portion of the circuit so that the leaves and debris 12 are allowed to fall when the collector 14 is translocated to the upper portion of the vertical circuit.

When the cog wheel 310 is rotated by the power drive 316 in an anti-clockwise directional sense 122, the collector 14 is moved up until the collector 14 reaches an elevated point for the collected leaves and debris 12 to fall into the storage bag 66. The collector 14 is moved downwardly to the ground when the power drive 316 drives the cog wheel 310 in a clockwise directional sense. The cylindrical distal end 354 of header beam 20 of collector 14 is made narrower so that the cylindrical distal end 354 is small enough to enter an eyelet 356 of a one of the chain link elements 330 of endless chain 328.

Figure 4:
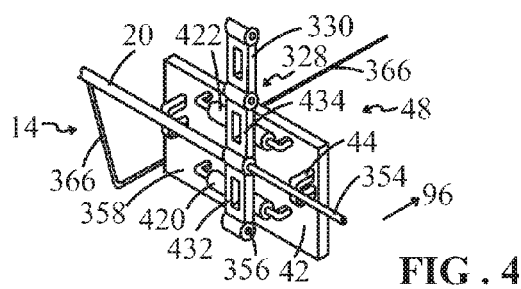
FIG. 4 is a simplified diagram of a guide member which is used to keep a proper orientation of the collector along a curved path.

The angular rotation of the collector 14 is restricted by a guide member 48 which is described in detail in FIG. 4. The guide member 48 comprises a rectangular plate 42 and an array of supporting legs 44 mounted on the header beam 20 and the cylindrical distal end 354 of header beam 20. The surface 358 of the rectangular plate 42 closer to the endless chain 328 is sliding on the chain link elements 330. The guide member 48 is to guide and maintain a proper orientation of the collector 14 with respect to the curved path 36 which is made possible by the rotating vertical circuit when the endless chain 328 rotates.

The stored program device means 140 of FIG. 1 is used with the aid of the sensors 130, 132, 136 in the control management of the operation of the debris collecting device 10. It is noted that the distal ends of the thin rods 16 of FIG. 1 can be made narrower to function as a tine. The thin rods 16 of FIG. 1 are replaced by a plurality of tines 366 as shown in FIG. 3.

Referring now to FIG. 4 in which the guide member 48 used in the above figures is described, the supporting legs 44 of guide member 48 are mounted to the header beam 20 and the cylindrical distal end 354 of header beam 20 by welding or bolts and nuts (not shown). Rollers 420, 422, which are added in FIG. 4, are mounted to the surface 358 of rectangular plate 42. The rollers 420, 422 are rolling on the surface of the chain link elements 330. As shown in FIG. 4, the rollers 420, 422 are touching some of the chain link elements 330, i.e. the first link element 432 and the second link element 434, when the link elements 432, 434 are aligned with each other. The tines 366 of collector 14 are pointing horizontally in the forward direction 96, when the collector 14 is lowered to the ground. The position of the multi-connecting support beam 40 can be adjusted via a slot (not shown) in the frame 76, so that the tines 366 reach the surface of the soil.

Figure 5:
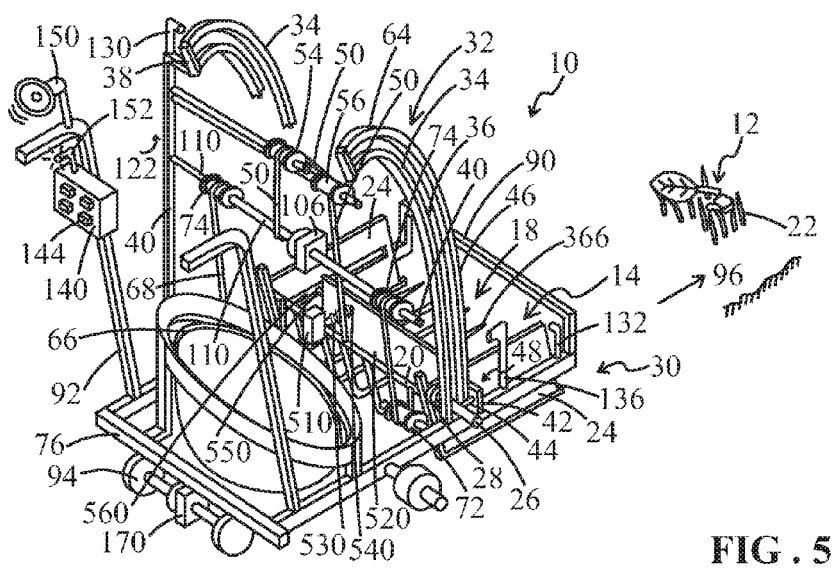
FIG. 5 is a simplified diagram of a fourth preferred embodiment using a sweeping assembly to remove the debris sitting in the collector.

In a fourth preferred embodiment of the invention shown in FIG. 5, a sweeping assembly, which is used in addition to the employment of the device components of FIG. 2, is added and installed. A motor drive 510 is mounted on the header beam 20 of collector 14. The motor drive 510 is used to move a movable wall plate 520 which is slidable on the platform 18 of collector 14. The sweeping assembly comprises the movable wall plate 520 which is moved to sweep away any remaining leaves and debris 12 which are stuck in the tines 366 of collector 14. The threaded drive axle 530 of motor drive 510 is threadebly entered into a threaded bore 540 in the movable wall plate 520. An array of protruding stubs 550 is mounted to the sides of the movable wall plate 520. An array of hollow longitudinal tracks 560 is embedded in the side walls 24 of collector 14. The movable wall plate 520 is moved across the platform 18 of collector 14 by the motor drive 510 and the leaves and debris 12 are removed from the tines 366, when the protruding stubs 550 of wall plate 520 are guided along the longitudinal tracks 560. The electrical wires to the motor drive 510 are not shown in the diagram.

Having described the invention and its preferred mode of operation in sufficient detail for those of normal skill in the art to practice the same, it will be obvious to such practitioners to make certain changes and variations in the specific elements of the disclosed embodiments without departing from the scope of the invention. For these reasons, the scope of the invention should not be limited by that which has been illustrated herein but should be limited only by the scope of the appended claims:

What is claimed is:

1. A device for removing debris from a lawn, in combination with a wheeled means defining a frame, comprising:
   a) collector means defining a parallel-beams type collector having a row of spaced-apart elongated thin rods for receiving said debris; an end portion of each said elongated thin rod is mounted to a supporting header beam; said collector is enclosed by a plurality of side walls to keep said debris in said collector;
   b) transport means defining a moving assembly which moves said collector to an elevated point which is higher above the ground; and
   c) storage means defining a container having an opening for receiving said debris;
   wherein said collector is moved essentially horizontally above the ground with said elongated thin rods pointing in a forward direction and penetrating through the grass; said debris sitting above the grass is picked up by said elongated thin rods as said elongated thin rods have already been moved under said debris; said elongated thin rods, together with said debris, are lifted along a guided path by said moving assembly; said debris is allowed to fall into said storage means at an elevated position of said guided path.

2. The device of claim 1, wherein said device comprises a plurality of structural elements which are configured to provide said guided path for the movement of said collector.

3. The device of claim 1, wherein said device comprises an array of two-legs members; each said two-legs member comprises a pair of legs which are separated to produce said guided path; a portion of said two-legs member is bent at an elevated point where said debris is allowed to fall into said storage means.

4. The device of claim 1, wherein said device comprises a sweeping assembly to remove said debris from said collector.

5. The device of claim 1, wherein said moving assembly comprises a plurality of rollers and flexible strings to move said collector.

6. The device of claim 1, wherein said moving assembly comprises a plurality of helical springs to return said collector to an initial operating state.

7. The device of claim 1, wherein said moving assembly comprises a plurality of cog wheels and a continuous chain;

said chain is rotated in a vertical circuit and a portion of said circuit provides said guided path for the translocation of said collector.

8. The device of claim 1, wherein said transport means comprises a plurality of power drives to move said collector.

9. The device of claim 1, wherein said device comprises a stored program device means for use in the control management of the operation of said device.

10. The device of claim 1, wherein said device comprises a plurality of guide members to guide and maintain a proper orientation of said collector with respect to said guided path.

11. The device of claim 1, wherein said device comprises a plurality of alerting accessories in the operation of said collector.

12. The device of claim 1, wherein the distal end of each said elongated thin rod is made narrower to function as a tine.

13. A device for removing debris from a lawn, in combination with a wheeled means defining a frame, comprising:
   a) collector means defining a parallel-beams type collector having a row of spaced-apart elongated thin rods for receiving said debris; an end portion of each said elongated thin rod is mounted to a supporting header beam; said collector is enclosed by a plurality of side walls to keep said debris in said collector;
   b) transport means defining a moving assembly which moves said collector to an elevated point which is higher above the ground;
   c) storage means defining a container having an opening for receiving said debris; and
   d) structural elements having a plurality of structures which are configured to provide a guided path for the movement of said collector;
   wherein said collector is moved essentially horizontally above the ground with said elongated thin rods pointing in a forward direction and penetrating through the grass; said debris sitting above the grass is picked up by said elongated thin rods as said elongated thin rods have already been moved under said debris; said elongated thin rods, together with said debris, are lifted along said guided path by said moving assembly; said debris is allowed to fall into said storage means at an elevated position of said guided path.

14. The device of claim 13, wherein said structural elements comprise an array of two-legs members; each said two-legs member comprises a pair of legs which are separated to produce said guided path; a portion of said two-legs member is bent at an elevated point where said debris is allowed to fall into said storage means.

15. The device of claim 13, wherein said device comprises a sweeping assembly to remove said debris from said collector.

16. The device of claim 13, wherein said transport means comprises a plurality of rollers and flexible strings to move said collector.

17. The device of claim 13, wherein said device comprises a stored program device means for use in the control management of the operation of said device.

18. The device of claim 13, wherein said device comprises a plurality of guide members to guide and maintain a proper orientation of said collector with respect to said guided path.

19. A device for removing debris from a lawn, in combination with a wheeled means defining a frame, comprising:
   a) collector means defining a parallel-beams type collector having a row of spaced-apart elongated thin rods for receiving said debris; an end portion of each said elongated thin rod is mounted to a supporting header beam; said collector is enclosed by a plurality of side walls to keep said debris in said collector;
   b) transport means defining a moving assembly which moves said collector to an elevated point which is higher above the ground;
   c) storage means defining a container having an opening for receiving said debris; and
   d) structural elements comprising an array of two-legs members; each said two-legs member comprises a pair of legs which are separated to produce a guided path; a portion of said two-legs member is bent at an elevated point where said debris is allowed to fall into said storage means;
   wherein said collector is moved essentially horizontally above the ground with said elongated thin rods pointing in a forward direction and penetrating through the grass; said debris sitting above the grass is picked up by said elongated thin rods as said elongated thin rods have already been moved under said debris; said elongated thin rods, together with said debris, are lifted by said moving assembly along said guided path which is provided by said structural elements; said debris is allowed to fall into said storage means at an elevated position of said guided path.

20. The device of claim 19, wherein said device comprises a sweeping assembly to remove said debris from said collector.

* * * * *